United States Patent [19]
Ohtsuki

[11] Patent Number: 5,920,758
[45] Date of Patent: Jul. 6, 1999

[54] IMAGE FORMING DEVICE WITH INTERNAL SPACE THAT ACCOMMODATES AN IMAGE HOLDING MEMBER

[75] Inventor: Kazutoshi Ohtsuki, Yokohama, Japan

[73] Assignee: Ricoh Company, Ltd., Tokyo, Japan

[21] Appl. No.: 09/114,192

[22] Filed: Jul. 13, 1998

[30] Foreign Application Priority Data

Jul. 11, 1997 [JP] Japan ................................ 9-186629

[51] Int. Cl.⁶ ................................................ G03G 15/00
[52] U.S. Cl. ........................ 399/405; 399/397; 399/107
[58] Field of Search ................................ 399/405, 107, 399/108, 110, 118, 411, 397, 381

[56] References Cited

U.S. PATENT DOCUMENTS 5,839,025 11/1998 Okauchi et al. .................... 399/405
5,839,032 11/1998 Yasui et al. ...................... 399/110 X

FOREIGN PATENT DOCUMENTS

| | | |
|---|---|---|
| 5-201603 | 8/1993 | Japan . |
| 5-207210 | 8/1993 | Japan . |
| 5-219308 | 8/1993 | Japan . |
| 6-124009 | 5/1994 | Japan . |
| 6-133092 | 5/1994 | Japan . |
| 8-339101 | 12/1996 | Japan . |
| 8-339103 | 12/1996 | Japan . |
| 8-339104 | 12/1996 | Japan . |

*Primary Examiner*—Richard Moses
*Attorney, Agent, or Firm*—Oblon, Spivak, McClelland, Maier & Neustadt, P.C.

[57] ABSTRACT

An image forming device with an image scanning capability includes an internal accessible space formed between an image scanning unit and an image forming unit. The internal space is for accommodating a recording medium transported through a vertical paper transportation path and ejected to the internal space by an ejection mechanism. The scanning unit is supported by a support assembly such that the scanning unit overhangs the internal space. The support assembly includes two support sides that connect a main body of the device, but leaves two contiguous sides of the internal space open and unblocked so that a user may easily access the recording medium contained in the internal space.

26 Claims, 5 Drawing Sheets

IMAGE FORMING DEVICE WITH INTERNAL SPACE THAT ACCOMMODATES AN IMAGE HOLDING MEMBER

BACKGROUND OF THE INVENTION

1. Field of the Invention

The present invention relate to an image forming device, and more particularly to an image forming device having an internal space between a scanner unit and an image forming unit for accommodating a discharge image holding member, such as a copy paper.

2. Discussion of the Background

Recently, due to a strong demand for machines that quickly make a first copy, image forming devices have been developed that use a vertical paper transportation path, i.e. in a upward or downward direction in this image forming device, and narrows a width of the transportation path.

Also, as presently recognized reducing the requisite tabletop space (i.e., device footprint) and height for accommodating an image forming device is desired in a modern office setting and thus a market demand for small image forming devices continues to increase.

Nevertheless, if it is attempted to accommodate a large size copy paper, such as a A3 size or a double letter size paper, within a discharge paper stack unit that is attached to a side of a main body of the image forming device, there is a limitation in making the width of the main body of the image forming device smaller. Moreover, the addition of the paper stack unit increases the tabletop space (or floor space) required to host the device.

In order to make the width of the main body of the image forming device smaller, some image forming devices form, instead of attaching a discharged paper stack unit to the side of the main body of the device, a space between an image forming unit and a scanner unit so that the copy paper that is conveyed through a transportation path of the image forming unit and is outputted to this space.

In an image forming device in which the copy paper is discharged to a space between the image forming unit and the scanner unit, two adjoining sides of the four sides of the scanner unit are connected to the main body of the image forming device and the scanner unit is supported by eaves-shaped members above the space. In other words, the remaining two sides of the four sides of the scanner unit are not connected to the main body of the image forming device. The reason for supporting the scanner unit with the eaves-shaped members is for making the width of the space smaller and thereby the size of the device is made small. Namely, instead of making the width of the space of sufficient size to accommodate a large size copy paper completely in the space, and for making the size of the device small, the width of the space is made to a minimum so that a large copy paper can be accommodated without any trouble.

However, as described above, only two adjoining sides out of the four sides of the scanner unit are connected to the main body of the device, and as a result, the scanner unit is supported in a rather unstable condition. The instability causes the contact glass (or platen) to warp under its own weight and consequently, when an image is formed by scanning an original document on the scanner unit, the resulting image is skewed or deformed.

SUMMARY OF THE INVENTION

An object of the present invention is to overcome the above-identified and other problems of conventional systems, by providing an image forming device with a scanner unit stably held over an image forming portion of the apparatus. This and other objects are obtained with an apparatus having the scanner unit supported by a cantilevered member in a stable condition by providing the cantilevered support member along a side of the scanner unit that is not connected to the main body of the device at both ends of the support member.

Also, the present invention provides for a compact image forming device by reducing the height of the image forming device relative to conventional devices through forming the support member in an L-like shape and bringing the side of the scanner unit not connected to the main body in contact with the surfaces of the L-like shaped support member.

Further, the present invention provides an image forming device that prevents quality degradation due to falling or vibration during transportation, such as, deformation of the scanner unit, by arranging a detachable reinforcing member between the main body of the image forming device and the side of the scanner unit that is not connected to the main body.

One embodiment of an image forming device according to the present invention includes a scanner unit that reads an image of an original document, an image forming unit that forms the image read by performing an image forming process, and a transportation path that transports a copy paper (or other image holding member) from a paper feeding tray at one side of the image forming device. An internal space is formed between the image forming unit and the scanner unit, and the copy paper transported through the transportation path is discharged to, and accommodated in (at least partially), the internal space. Two sides of the scanner unit are connected to the image forming unit as a main body of the image forming device to support the scanner unit in an overhanging arrangement, much like an eave, although level. A side of the scanner unit that is not connected to the main body of the device is supported by a cantilevered support member arranged along the side of the scanner unit that is connected only on one end thereof.

The support member may have an L-shaped cross section and the side of the scanner unit that is not directly supported by the main body of the image forming device may be supported by the support member with surfaces of the side of the scanner unit contacting surfaces of the support member.

The supporting member, having the L-shaped cross section, may be bent in a middle part thereof so that a horizontal portion of the supporting member supports the scanner unit while the vertical portion may be fixed to the main body of the image forming device.

Furthermore, a reinforcement member may be detachably arranged between the main body of the image forming device and a side of the scanner unit that is not connected to the main body of the image forming device. The reinforcement member is used when transporting the device, but removed during system operation.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
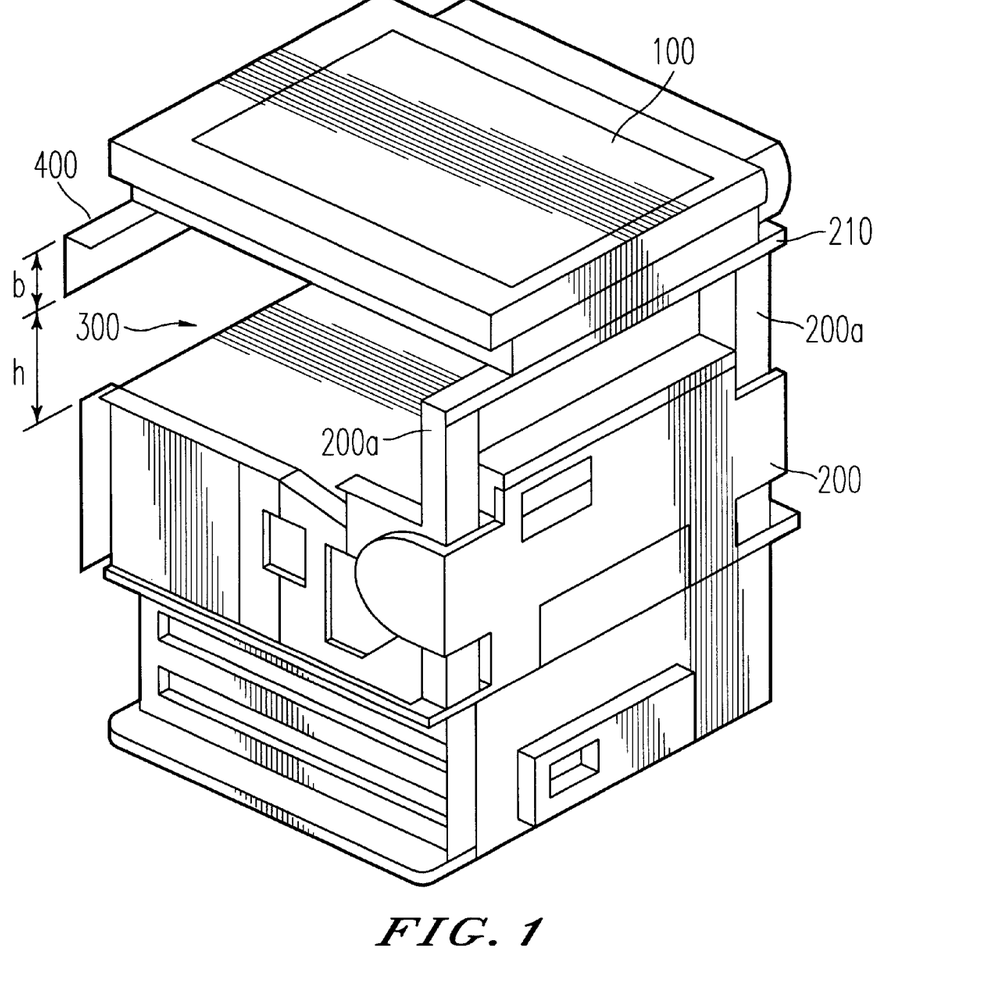
FIG. 1 is a schematic oblique drawing illustrating an example of an image forming device according to the present invention.

Referring now to the drawings wherein, an image forming device according to the present invention is described below with reference to the Figures and more particularly, FIG. 1 shown an example of an image forming device that includes a scanner unit 100 that overhangs an image forming unit 200. As shown in FIG. 1, along the edge of the right side and the rear side of the image forming unit 200 a support member 200a is installed that stands vertically from the horizontal surface of the image forming device 200. FIG. 1 shows only the supports 200a that stand along the right side edge of the image forming device 200 but another is found at the back-left corner. The height of these supports 200a set the height of an internal space 300 which will be explained in greater detail later. Alternatively, instead of the above described supports 200a, one or more side walls may be used.

On the upper ends of the supports 200a, which are shown to stand on the front and the rear of the right side of the image forming unit 200, respectively, a frame 210 spans the supports 200a. There is also provided a similar frame (not illustrated) spanning the upper ends of the supports 200a that stand on the left and the right side of the rear of the image forming unit 200. The scanner unit 100, which reads an image of an original document placed thereupon, rests on the above-mentioned frame 210 and the rear frame. Namely, the right side edge and rear side edge of the scanner unit 100 are attached to the above-described support 200a of the image forming unit 200 respectively and the scanner unit 100 is supported thereby so as to overhang the image forming unit 200. Thus, between the scanner unit 100 and the image forming unit 200, there is formed an internal space 300. This space 300 serves, as described below, as a paper exit portion that accommodates a copy paper transported through a transportation path. Notice that the front-left corner of the scanner unit 100 rests on a bar type support member 400, but the bar type support bar 400 itself is not supported by a vertical support member that carries a weight load of the scanner unit 100 to the image forming unit 200 at a point beneath the front-left corner of the scanner unit 100. Rather, the support bar is cantilevered from the rear-left corner of the vertical support 200a. Thus, two contiguous sides (front and left sides, as shown) of the internal space 300 are unblocked and remain open for visual inspection and for accessing the internal space 300.

Figure 2:
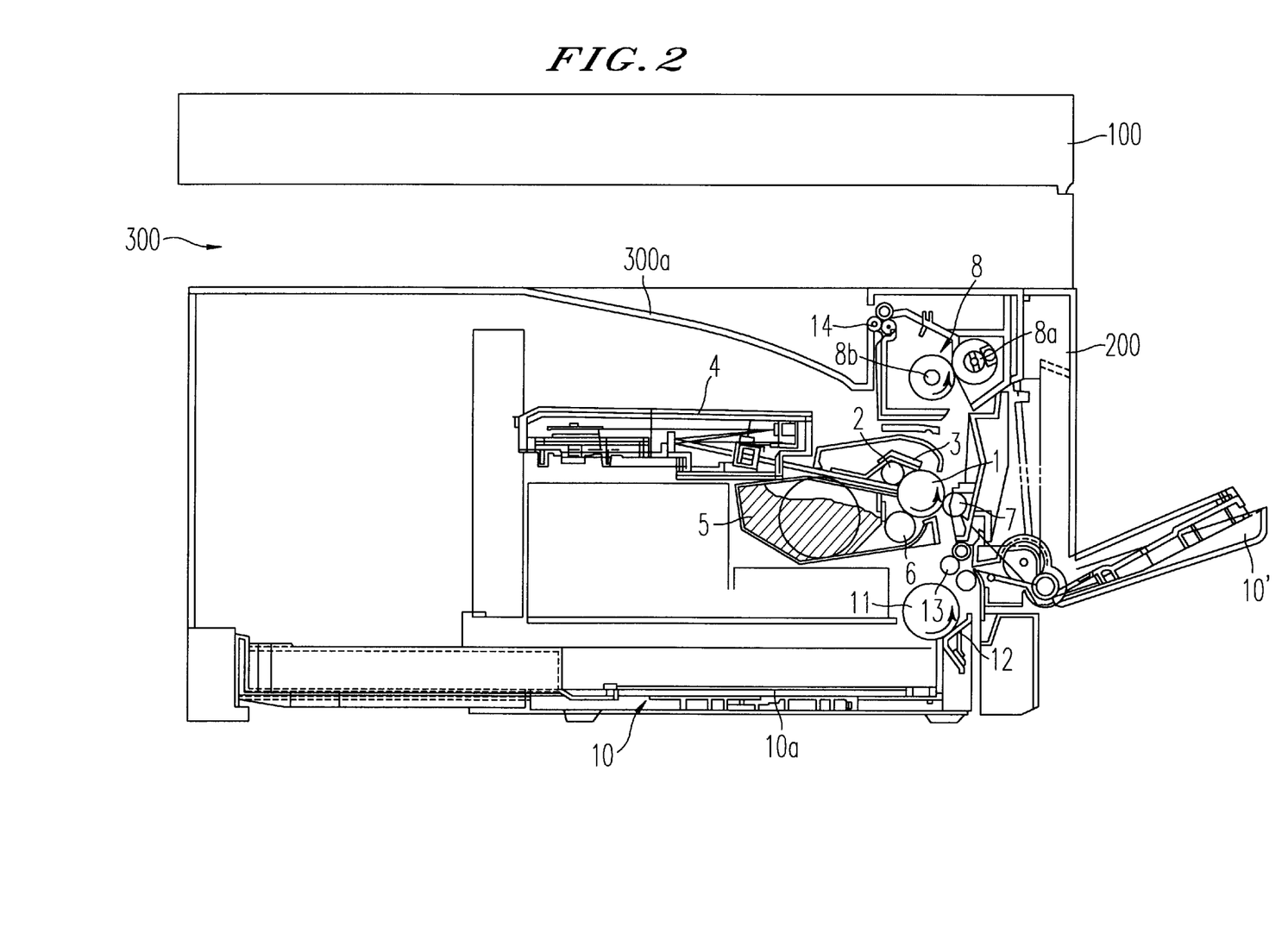
FIG. 2 is a cross sectional view of the image forming device of the present invention.

As shown in FIG. 2, in the center of the image forming unit 200, there is provided a photosensitive drum 1 (or belt). Around the photosensitive drum 1, there are provided a charging device 2, a cleaning device 3, a laser optical system 4, a toner supply unit 5, a developing device 6, an image transfer device 7, a fixing device 8 and other components properly arranged to support an image forming operation. During the image forming operation, the photosensitive drum 1 rotates counterclockwise at a constant speed and is evenly charged to a predetermined electric potential by way of the charging device 2. A flux of light is ejected from a light source arranged in the laser optical system 4 and deflected at an equiangular velocity by a deflecting device so as to form a latent image on the photosensitive drum 1. The light is first processed through an image forming optical system that includes an image forming lens and a reflector mirror. The surface of the drum 1 is scanned with the light in the main scanning direction of the photosensitive drum 1 to be exposed. By performing this main scanning and sub-scanning by rotation of the photosensitive drum 1, the latent image corresponding to the original image is formed on the surface of the photosensitive drum 1.

The latent image is developed by the developing device 6 to form a visible image. Namely, toner supplied from the toner supply unit 5 through the developing device 6 adheres to the latent image and the visible image is thus formed on the surface of photosensitive drum 1. This visible image is transferred by the transfer device 7 onto a copy paper transported through a transportation path described later. Alternatively, the copy paper may be an overhead projection film or other image holding member. The visible image on the copy paper is fixed by the fixing device 8 and the copy paper is discharged to the internal space 300. The surface of the photosensitive drum 1 is electrically discharged and cleaned by the cleaning device 3 after transferring the image.

Next, movement of the copy paper transported through the transportation path will be explained. As shown in the FIG. 2, the copy paper is fed from a feeding tray 10 installed at the lower part of the image forming unit 200. Specifically, the feeding tray 10 is detachable from the main body of the image forming device and FIG. 2 shows the feeding tray 10 being set in the main body.

The copy paper stacked in this feeding tray 10 is pushed upward by a bottom plate 10a and at the same time the uppermost paper stacked in the feeding tray 10 touches a paper feeding roller 11. The copy paper stacked in the paper feeding tray 10 is separated one by one by way of a separating pad 12 by counterclockwise rotation of the paper feeding roller 11 in the direction in the drawing, and is transported up to a registration roller 13.

The copy paper is transported to the transfer device 7 according to a timing sequence that coincides with the formation of the visible image on the photosensitive drum 1. The transfer device 7 is located above the registration roller 13 and thus the copy paper is transported upward. The visible image is transferred to the copy paper by the transfer device 7. The copy papers is further transported to the above-mentioned fixing device 8, located above the transfer device 7. The visible image is fixed to the copy paper by being passed between a fixing roller 8a with a built-in heater and a pressure roller 8b pressed against the fixing roller 8a. The copy paper is discharged into the space 300 by way of a pair of paper discharge rollers 14 with the fixed visible image facing downward. Alternatively, the components may be rearranged so that the image is discharged when facing upwards. Thus, the transportation path of copy paper is formed in a vertical direction at the right side of the image forming unit 200, as shown in FIG. 2.

The image forming device may be provided with a second paper feeding tray 10', that projects from the image forming unit 200 as illustrated in FIG. 2. Not only the copy paper may stacked in the paper feeding tray 10, but also the copy paper stacked in the second paper feeding tray 10' is transported as described above.

Next, the above-mentioned space 300 will be explained. As described above, the space 300 is formed in-between the image forming unit 200 and the scanner unit 100 by supporting the scanner unit 100 in an overhanging arrangement with the supports 200a of the image forming unit 200. As described above, out of the four sides of the scanner unit 100, while the right side and the rear side in the FIG. 1 are attached to the main body of the image forming device by way of vertical supports 200a, the left side and the front side of the scanner unit 100 are not supported with vertically oriented members positioned beneath these sides. Consequently, the left and the front sides of the above space 300 are left open and unblocked to user access. Also, the height of the space 300 is made such that the support 400 or the scanner unit 100 itself does not hinder accessing discharged paper collected in the internal space 300. On the other hand, the internal space 300 is not made so high that the overall height of the system is not cumbersome and top heavy.

This space 300 serves as a so-called paper discharge portion that accommodates a copy paper transported through the vertical transportation path from the paper feeding tray 10 or the paper feeding tray 10'. As shown in the FIG. 2, a bottom part 300a of this space 300 slants so that the paper discharge roller side is lower. The copy paper is conveyed through the transportation path and is stacked one after another on this bottom part 300a with the surface of the fixed visible image facing downward.

As described above, a copy paper is transported through the transportation path which extends in the vertical direction (from the bottom to the top in the FIG. 2), and is accommodated in the internal space 300. This transportation path is formed, as shown in the FIG. 2, at the right side of the photosensitive drum 11. Therefore, the copy paper transported through the transportation path is stacked on the bottom part 300a of the space 300 from the right side toward the left side in the FIG. 2. The transportation path oriented in the vertical direction and formed at the right side of the photosensitive drum enables the left side of the space 300 to remain open and unblocked. Alternatively, the transport path may eject papers from the rear-right wall (FIG. 1) of the image forming unit 200 into the internal space 300.

If the transportation path is formed at the left side of the photosensitive drum 1 and a copy paper is transported through this transportation path and stacked in the above space 300, when a large size copy paper, such as a A3 size paper, is used, a leading edge of the copy paper strikes against the above support 200a and at the same time, a trailing edge of the copy paper remains in the image forming unit 200. Therefore, if it is attempted to stack a large size copy paper, such as a AA3 size paper, completely on the bottom part 300a of the space 300, the dimensions of the above paper discharge portion have to be enlarged to the left and right directions. As a result, the advantage of the image forming device which is characterized by the possibility of making the whole device compact is compromised.

Figure 3:
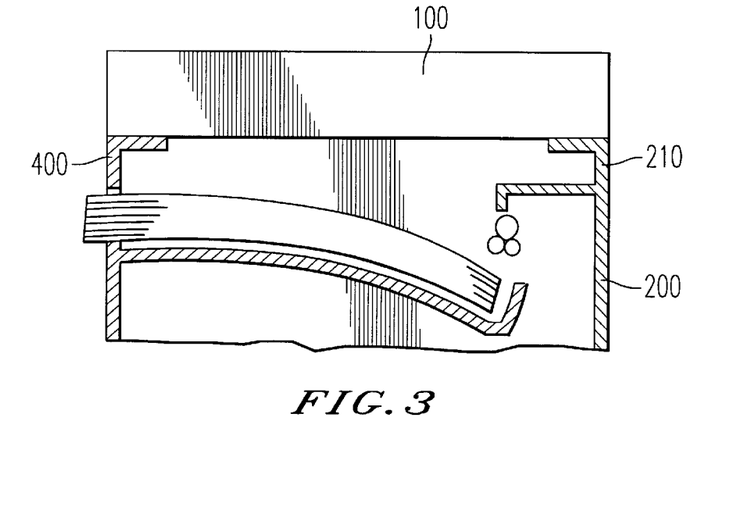
FIG. 3 is a cross sectional view of an internal space feature of the present invention shown with a stack of large sheets stacked in the internal space and having a leading edge side of the stack protruding from the main body of the device and out of the internal space.

A feature of the present invention is to provide a compact size main body of the image forming device. If the width of the main body of the device, and consequently the width of the space 300, is made to accommodate a large size copy paper completely in the space 300, the device has to be enlarged. Therefore, though a large size copy paper cannot be accommodated completely in the space 300, the left side and the front side of the space 300 in the FIG. 1 remain open so that a large size copy paper can be stacked in the space 300 without any trouble. In other words, as shown in FIG. 3, a large size copy paper is stacked in the space 300 with a leading edge portion thereof protruding from the main body of the device and extending out of the left side of the opening (as shown). In the case that the transportation path is formed in the left side of the photosensitive drum 1, the front side and the right side of the space 300 are made open.

Next, a supporting member aspect of the present invention will be explained. As shown in the FIG. 1, along the bottom edge of the left side of the scanner unit 100, the bar type support member 400 is provided. This support member 400 is fixed to the main body of the image forming device at is rear end, but is unsupported at its forward end.

The bar type support member 400 has cross-sectional structural features as shown in FIG. 1 that include a vertical dimension "b" that is 60 mm or more in length. The reason for making the vertical dimension "b" of the support member 400 to be 60 mm or more in length is to ensure that the support member 400 provides the minimum strength required to adequately support the scanner unit 100. Moreover, the support member 400 is appropriately sized to adequately support the scanner unit 100 when the scanner unit 100 is held flat, without subjecting the glass contact plate of the scanner unit 100 to bend under its own weight, which would result in image skew or deformation. In the present embodiment, 60 mm is a sufficient length in the "b" dimension to prevent image skew for the type of scanner unit 100 used in the present embodiment. Alternatively, the scanner unit 100 itself may incorporate horizontal stiffeners oriented in the same direction as the support member 400, where the stiffeners assist in maintaining the mechanical integrity of the scanner unit 100 so that the burden does not fall completely on the support member 400. As a consequence, in this alterative configuration, the length in the "b" dimension of the support member 400, may be less than 60 mm.

In the above described configuration, the right and rear edges of the scanner unit 100 are directly supported by horizontally oriented members attached to the image forming unit 200 at the main body of the image forming device, but the left edge of the scanner unit 100 is only supported by the support member 400, with no horizontal member directly bearing the load at the left front corner of the scanning unit 100. Accordingly, when compared with an image forming device that is not equipped with the support member 400, the present scanner unit 100 can be held more strongly, with lower risk of experiencing image skew.

In the exemplary embodiment shown in the FIG. 1, only the support member 400, which is arranged in a cantilevered fashion, is made to support the edge of the left side of the scanner unit 100. However, the support member 400 may also be arranged to support the edge of the front side of the scanner unit 100 with an end of the support member 400 being fixed on the front part of the right side of the main body of the device. Alternatively, another support member, like support member 400, may be employed to support the front edge of the scanning unit 100 so that the left-front edge of the scanning unit is prevented from sagging by use of both the support member 400 along the left edge, and the other support member supporting the front edge of the scanning unit 100. Also, as shown in the FIG. 3, the above-described support member 400 may be formed with at least a partial side wall in which an opening is formed, where the opening is for a user to access ejected sheets. However, as presently recognized, because it is easier for an operator to visually inspect the internal space 300 and access the internal space 300, it is preferred to employ the support member 400 in a bar shape as described above, where the support member is cantilevered from a back portion of the scanning unit 100.

Because the support member 400 is constructed with the vertical dimension "b" of its cross section being, for instance, 60 mm or more, for supporting the scanner unit 100 in a stable condition, when the necessary height of the above space 300 is set as "h" (see FIG. 1), then the height from the bottom part 300a of the space 300 to the bottom of the scanner unit 100 becomes the height of b+h. Therefore, the main body of the image forming device become higher by the vertical dimension "b" of its cross section of the support member 400.

Figure 4:
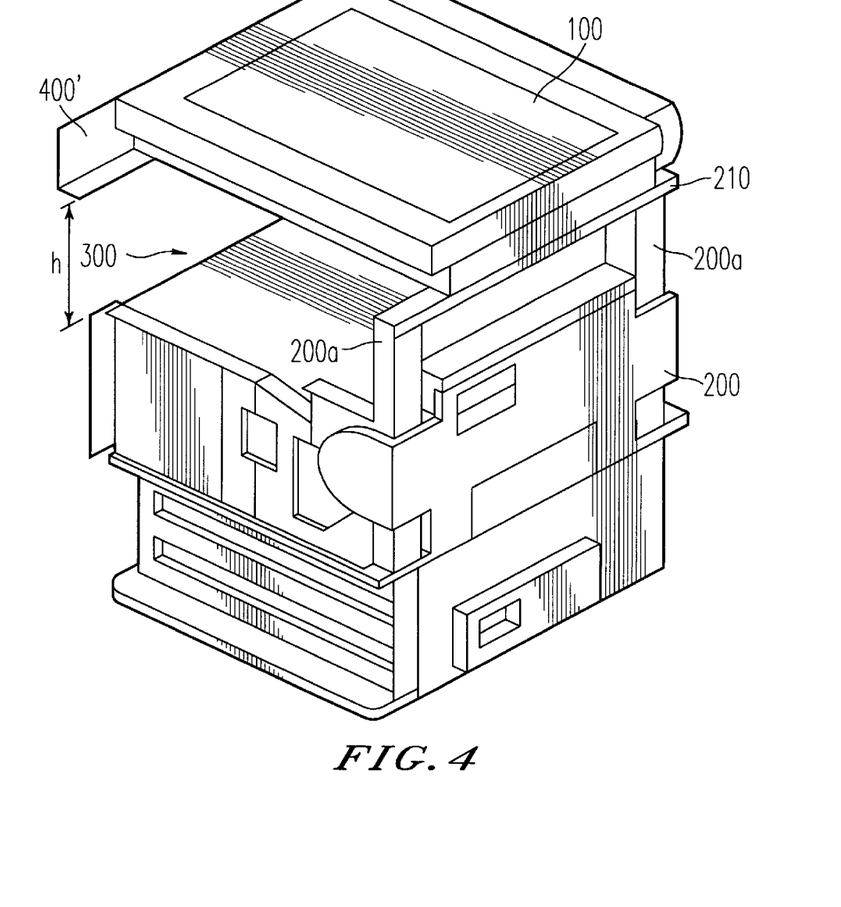
FIG. 4 is a schematic oblique drawing illustrating another example of an image forming device according to the present invention.

FIG. 4 illustrates an alternative example of an image forming device according to the present invention in which a support member 400' is arranged such that the height of the main body is minimized and compactness of the main body of the image forming device is achieved. As shown in the FIG. 4, along the edge of the left side of the scanner unit 100, there is provided the support member 400', which has an L-shaped cross section. The support member 400' extends horizontally from the rear part to the front part of the main body of the image forming device. The side surface and the bottom surface of the left side edge of the scanner unit 100 touch the surfaces of the L-shaped support member 400' and thereby the left side edge of the scanner unit 100 is supported by the support member 400'. One end of the support member 400' is fixed to the main body of the device like the support member 400 in the previous embodiment. Furthermore, like the support member 400, the support member 400' is cantilevered from the back portion of the main body of the device, and at its forward end contains no horizontal support that connects to the main body of the device.

Because the edges at the right side and the rear side of the scanner unit 100 are respectively attached to the image forming unit 200 of the image forming device, and, because the edge at the left side of the scanner unit 100 is supported by the support member 400', compared with an image forming device that is not equipped with the cantilevered supporting member, the scanner unit 100 is supported in a stable condition. Consequently, image skew or image deformation which may occur when the scanner unit 100 is supported in an unstable condition is prevented.

Figure 5:
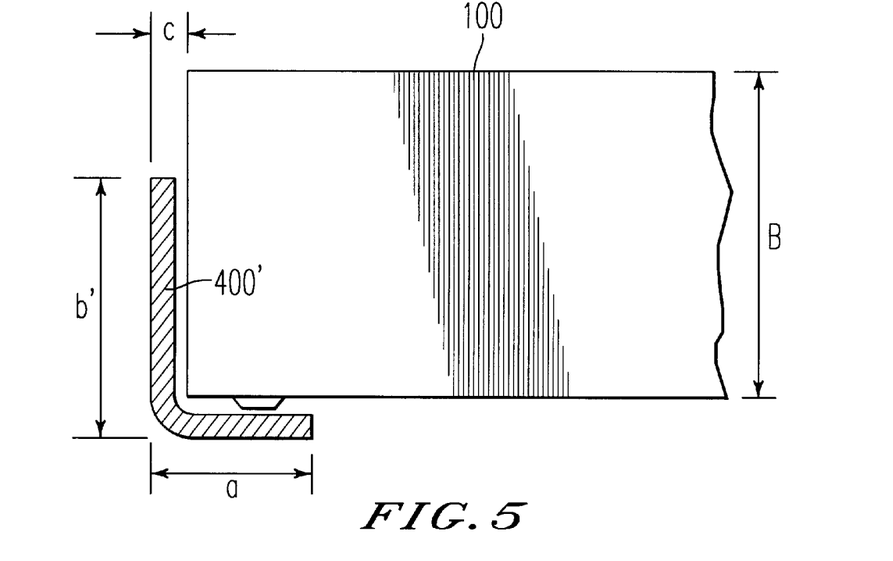
FIG. 5 is a schematic drawing illustrating a positional relationship between a support member of the device of FIG. 4 and the scanner unit.

As shown in the FIG. 5, a thickness dimension "c" from the left side surface of the scanner unit 100 to the outside surface of the above support member 400' represents the thickness of the support member 400'. When the necessary height of the above space 300 is assumed to the "h" (FIG. 1), the height from the bottom part 300a of the space 300 to the bottom of the scanner unit 100 is c+h, which is lower than the height b+h and which is necessary when the above support member 400 shown in the FIG. 1 is used. Therefore, the height of the main body of the image forming device can be lower than when the above described support member 400 shown in the FIG. 1 is used, and compactness of the main body of the image forming device is achieved.

The above-described support member 400' in the example shown in FIGS. 4 and 5 is arranged like the support member 400 in the example shown in the FIG. 1, to ensure the requisite strength needed to prevent occurrence of skew and image deformation. In FIG. 5, when a load is added from above, generally, the strength of the material is increased in proportion to the horizontal dimension "a" and in proportion to the third power of the vertical dimension b'. Therefore, if the vertical dimension b' is made larger, the strength will be increased.

As shown in FIG. 5, because the height dimension, namely, the thickness dimension B of the scanner unit 100 itself is normally 80 mm or more, a vertical dimension b' of the cross section of the above support member 400' can be made to 80 mm, which is enough to prevent skew or image deformation. Even if the vertical dimension b' of the cross section of the above support member 400' is made the same as the height dimension B of the scanner unit 100, it will not affect the height of the image forming device, because it is the thickness c of the support member 400' that affects the height of the image forming device.

Figure 6:
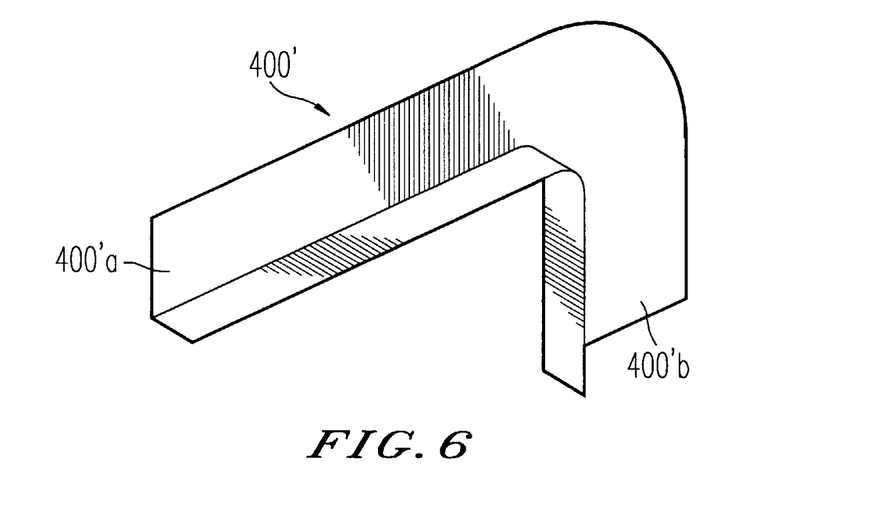
FIG. 6 is a partial oblique drawing illustrating another example of the support member according to the present invention.

The support member 400' can also be bent at a right angle in a middle part thereof in the longitudinal direction to form a part 400'a and a part 400'b, as shown in the FIG. 6. In this case, the part 400'a of the support member 400' may be attached, for instance, to the left side edge of the scanner unit 100 and the other part 400'b may be fixed to the main body of the image forming device. With this arrangement, the scanner unit 100 is supported in a more stable condition than when one end of a linear-shaped support member is fixed to the main body of the device.

Figure 7:
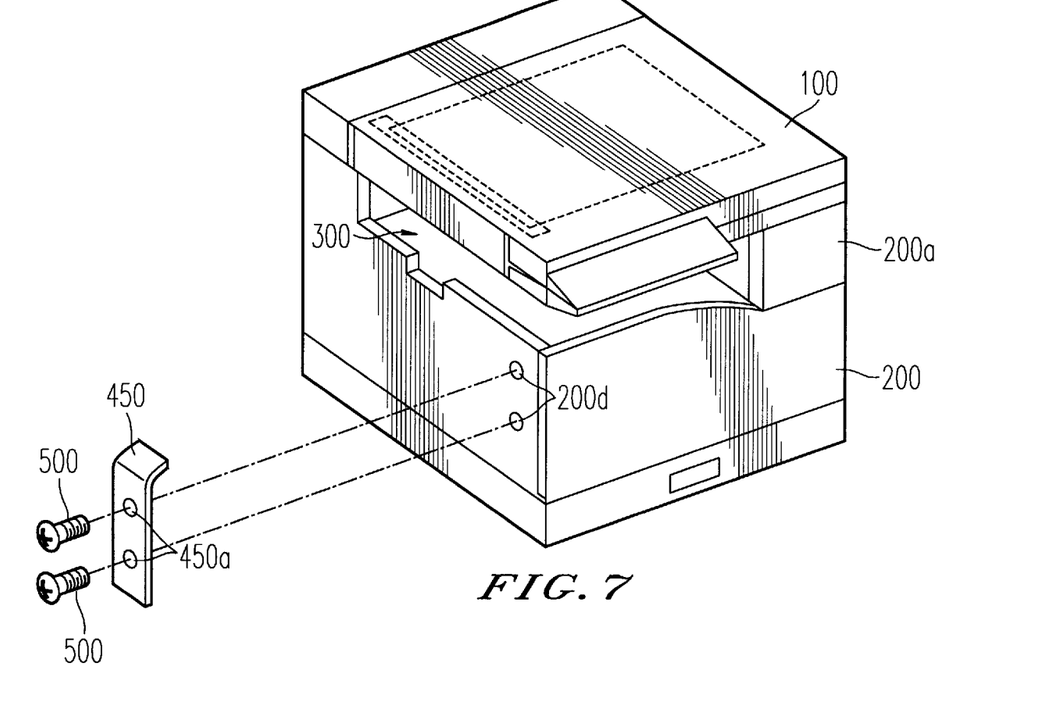
FIG. 7 is a schematic oblique drawing illustrating a temporary-use reinforcement member according to the present invention.
Figure 8:
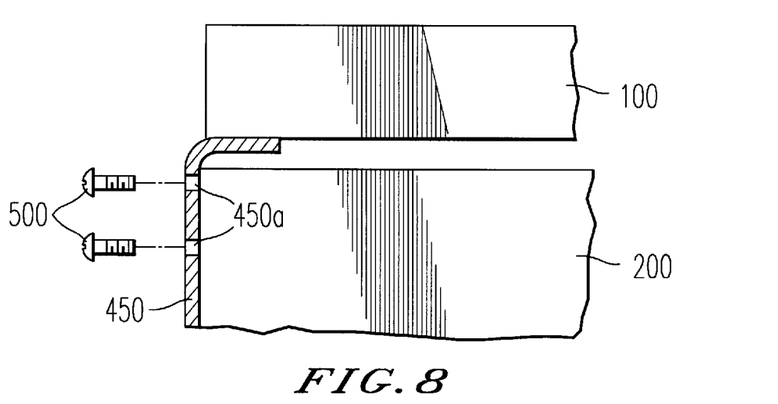
FIG. 8 is a cross sectional view illustrating a contact state between the temporary-use reinforcement member and the scanner unit.

Next, another embodiment in which an additional support member is provided will be explained. As shown in FIGS. 7 and 8, on the side wall of the image forming unit 200, near the corner of two adjacent open sides of the open space 300, an appropriate number of threaded screw holes 200d are formed. As shown, two screw holes 200d are formed, aligned in a direction parallel to the height direction of the main body, where the number of screw holes may be as small as one or greater than two.

An L-shaped reinforcement member 450 having a relatively flat contact surface has two threaded holes 450 formed therein that align with the two screw holes 200d. By using the screws 500 to secure the L-shaped (or J-shaped) reinforcement member 450, the reinforcement member 450 is detachable from the main body of the device. As shown in FIG. 8, when the reinforcement member 450 is attached to the image forming unit 200, one side of the reinforcement member 450 contacts the bottom of the scanner unit 100 and thereby a portion of the load of the scanner unit 100 is carried by the reinforcement member 450.

The reinforcement member 450 is employed to protect the above-mentioned scanner unit 100 from warping or bending during transportation. As described above, the front and right side edges of the scanner unit 100 are connected to the image forming unit 200 as the main body of the image forming device, and further, the left side edge of the scanner unit 100 is supported by the support member 400 or the support member 400'. However, because the remaining side is not supported, it is difficult to prevent the structural integrity of the overhanging scanning unit 100 from being compromised, resulting in image skew and image deformation. Thus, this reinforcement member 450 prevents deformation which may occur due to impact loading, dropping of the device, vibration, or other stresses that occur during transportation. The reinforcement member 450 is detached when the image forming deice is used in operational settings.

Obviously, numerous additional modifications and variations of the present invention are possible in light of the above teachings. It is therefore to be understood that within the scope of the appended claims, the present invention may be practiced otherwise than as specifically described.

This document contains subject matter related to Japanese patent application No. 09-186629 filed Japanese Patent Office on Jul. 11, 1997, the entire contents of which being incorporated herein by reference.

I claim:

1. An image forming device, comprising:
   a scanning unit;
   an image forming unit having,
      a first side, and
      a recording member ejection port formed on the first side of said image forming unit and being of sufficient size to have ejected therethrough in a predetermined direction a recording member,
   a support structure configured to hold the scanning unit above said image forming unit with a recording member collecting space positioned between said image forming unit and said scanning unit, said support structure having,
      a first support member positioned on the first side of said image forming unit and configured to support at least one half of a first side of said scanning unit, and
      a second support member configured to support at least one half of a second side of said scanning unit, wherein
   said second side of said scanning unit opposing the first side of said scanning unit, and being positioned at a downstream position with respect to said predetermined direction,
   said recording member collecting space having an unblocked, accessible side opening that continuously extends from a first side of the collecting space to at least a portion of an adjacent second side of the collecting space.

2. The image forming device of claim 1, wherein:
   said recording member collecting space being configured to hold at least half of the recording member therein, said recording member having a surface area being at least as large as an A4 size recording member, and at least a portion of said recording member extending through the unblocked, accessible opening.

3. The image forming device of claim 1, wherein:
   said first member being at least one of a continuous sidewall, and at least two vertical members.

4. The image forming device of claim 1, wherein: said second support member including a single vertical member.

5. The image forming device of claim 4, wherein:
   a width of said vertical member being less than or equal to one half of a length of the second side of the scanning unit.

6. The image forming device of claim 1, wherein:
   said first support member includes a horizontal member that supports the at least one half of the first side of the scanning unit.

7. The image forming device of claim 1, wherein:
   said second support member includes a horizontal member that supports the at least one half of the second side of the scanning unit.

8. The image forming device of claim 1, wherein:
   the second support member, includes a horizontal member that supports an entire length of the second side of the scanner.

9. The image forming device of claim 1, further comprising:
   a third support member, that interconnects the first support member to the second support member.

10. The image forming device of claim 1, wherein:
    said support structure supports only three of four corners of said scanning unit, said three of four corners being supported by respective underlying vertical members connected to said image forming unit.

11. The image forming device of claim 1, wherein:
    said scanning unit has a third scanner side between the first side and the second side of the scanning unit;
    said support structure not having a horizontal member that supports an entire length of the third scanner side, such that the third scanner side defines an upper edge of the opening.

12. The image forming device of claim 1, wherein:
    said second support member includes two connecting members being connected to one another and each having a surface that faces the scanning unit.

13. The image forming device of claim 12, wherein:
    a first of the two connecting members being vertically oriented so as to face a side of the scanning unit, and the other of the connecting members being horizontally oriented so as to face a bottom portion of the scanning unit.

14. The image forming device of claim 12, wherein:
    said connecting members being connected in a perpendicular orientation with respect to each other.

15. The image forming device of claim 12, wherein:
    said connecting members being connected at a right angle so as to have a composite L-shape cross section.

16. The image forming device of claim 12, wherein:
    one of said connecting members being a vertical member portion having a vertical height not greater than a vertical height of the scanning unit.

17. The image forming device of claim 16, wherein:
    the vertical height of the vertical member portion being less than or equal to 80 millimeters.

18. The image forming device of claim 12, wherein:
    one of said two connecting members having a horizontally oriented surface, and the other of the two connecting members having a vertically oriented surface; and
    a strength of said support member being set by a width of the connecting member having the horizontally oriented surface times a height of the other connecting member.

19. The image forming device of claim 1, wherein:
    said second support member, includes
       a vertical portion connected to the image forming unit, and
       a horizontal portion positioned to contact and support an underside of the scanning unit, said vertical portion and said horizontal portion being joined with a radial bend portion.

20. The image forming device of claim 19, wherein:
    said horizontal portion of said second support member having
       a horizontally oriented lip that contacts the underside of the scanning unit, and
       an adjacent vertical member connected to the horizontally oriented lip and having a vertically oriented face.

21. The image forming device of claim 1, wherein:

said image forming unit includes a vertical paper transport path formed on a same side of said image forming unit as said recording member ejection port.

22. The image forming device of claim 1, further comprising:

a detachable reinforcement member configured to connect to an opposing side of said image forming unit during a non-operating mode of operation, said opposing side being opposite said first side with respect to said receiving member collecting space, wherein said detachable reinforcement member having an extension portion that contacts and supports said scanning unit at a position above said accessible side opening.

23. An image forming device, comprising:

a scanning unit;

an image forming unit having a recording member ejection port configured to eject a recording member in a predetermined direction and formed on a first side of said image forming unit;

a support structure configured to hold the scanning unit above said image forming unit so as to form a recording member collecting space therebetween, said support structure having, a first support member positioned on the first side of said image forming unit and configured to support at least one half of a first side of said scanning unit, and a second support member configured to support at least one half of a second side of said scanning unit, wherein said second side of said scanning unit being an opposing side of the first side of said scanning unit, and being oriented in an orthogonal direction relative to the predetermined direction, and said recording member collecting space having an unblocked side opening that continuously extends from a first side of the collecting space to at least a portion of an adjacent second side of the collecting space.

24. An image forming device, comprising:

a scanning unit;

an image forming unit having a recording member ejection port configured to eject a recording member in a predetermined direction;

a support structure configured to hold the scanning unit above said image forming unit so as to form a recording member collecting space therebetween, said support structure having, a first support member positioned at a first side of said image forming unit and configured to support at least one half of a first side of said scanning unit, and a second support member configured to support at least one half of a second side of said scanning unit above a second side of said image forming unit, wherein said recording member ejection port being formed between said first side of said image forming unit and said second side of said image forming unit, said second side of said scanning unit being an opposing side of the first side of said scanning unit, and said first side of said scanning unit and said second side of said scanning unit being oriented in a parallel direction relative to the predetermined direction, and said recording member collecting space having an unblocked side opening that continuously extends from a first side of the collecting space to at least a portion of an adjacent second side of the collecting space.

25. An image forming device, comprising:

means for scanning an original document;

means for forming an image on a recording member, including means for ejecting the recording member in a predetermined direction;

means for overhanging the means for scanning over the means for forming an image, including means for providing an internal recording member collecting space for collecting the recording member after being ejected by said means for ejecting; and means for providing continuous unblocked, accessible opening on at least two adjacent sides of said recording member collection space for allowing an operator to retrieve recording members contained within said recording member ejection space from either of the two sides.

26. The image forming device of claim 25, further comprising:

means for supporting said means for scanning at a position along said at least two adjacent sides when not operating in a recording member ejection mode of operation.

* * * * *